United States Patent
Jiang et al.

(10) Patent No.: US 7,647,389 B2
(45) Date of Patent: Jan. 12, 2010

(54) METHOD FOR CONFIGURATION NEGOTIATION IN A DATA COMMUNICATION SYSTEM

(75) Inventors: Frances Jiang, Whippany, NJ (US); Carol Picot, Boonton Township, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 618 days.

(21) Appl. No.: 10/084,174

(22) Filed: Feb. 28, 2002

(65) Prior Publication Data
US 2003/0163565 A1  Aug. 28, 2003

(51) Int. Cl.
| | |
|---|---|
| G06F 15/177 | (2006.01) |
| G06F 15/173 | (2006.01) |
| G06F 15/16 | (2006.01) |
| H04W 36/00 | (2009.01) |
| H04L 12/28 | (2006.01) |
| H04J 3/00 | (2006.01) |
| H04J 3/22 | (2006.01) |

(52) U.S. Cl. .............. 709/220; 709/221; 709/222; 709/227; 709/228; 709/230; 455/433; 455/436; 370/230; 370/464; 370/465

(58) Field of Classification Search ........ 709/220–228; 455/433–436; 370/230, 464–469
See application file for complete search history.

(56) References Cited

U.S. PATENT DOCUMENTS

| | | | |
|---|---|---|---|
| 5,241,598 A * | 8/1993 | Raith | 380/248 |
| 6,085,086 A * | 7/2000 | La Porta et al. | 455/432.3 |
| 6,216,004 B1 * | 4/2001 | Tiedemann et al. | 455/442 |
| 6,487,288 B1 * | 11/2002 | Tuunanen | 379/230 |
| 6,539,030 B1 * | 3/2003 | Bender et al. | 370/469 |
| 6,591,103 B1 * | 7/2003 | Dunn et al. | 455/436 |
| 6,636,502 B1 * | 10/2003 | Lager et al. | 370/352 |
| 7,006,528 B1 * | 2/2006 | Kokkinen | 370/467 |
| 7,054,332 B2 * | 5/2006 | Favichia et al. | 370/466 |
| 7,349,425 B2 * | 3/2008 | Leung et al. | 370/465 |
| 2002/0097707 A1 * | 7/2002 | Balazinski et al. | 370/351 |
| 2002/0114305 A1 * | 8/2002 | Oyama et al. | 370/338 |
| 2002/0132611 A1 * | 9/2002 | Immonen et al. | 455/414 |
| 2005/0286418 A1 * | 12/2005 | Rasanen | 370/230 |

* cited by examiner

*Primary Examiner*—Nathan J Flynn
*Assistant Examiner*—Joshua Joo
(74) *Attorney, Agent, or Firm*—Harness, Dickey & Pierce

(57) ABSTRACT

In the method for configuration negotiation in a data communication system, an access network receives an access request and a token from an access terminal. The token includes at least one bit associated with a parameter group type, and the bit indicates whether the access terminal is operating according to a default parameter group for the associated parameter group type. The access network sends information to and receives information from the access terminal according to the default parameter group without negotiating a parameter group of the associated parameter group type when a portion of the access network communicating with the access terminal operates according to the default parameter group for the associated parameter group type and the bit indicates the access terminal operates according to the default parameter group for the associated parameter group type.

19 Claims, 2 Drawing Sheets

METHOD FOR CONFIGURATION NEGOTIATION IN A DATA COMMUNICATION SYSTEM

BACKGROUND OF THE INVENTION

1. Field of the Invention

The present invention relates to the field of communication, and more particularly, configuration negotiation in a data communication system.

2. Description of Related Art

In a data communication system, access terminals (e.g., a mobile station, modem, etc.) communicate with an access network (analogous to the base station/mobile switching center network of a wireless communication system). Typically, parameters (e.g., parameters of communication protocols such as access protocols, power control protocols, etc.) governing the communication between the access terminal and the access network are communicated to access terminals over a control channel.

As the number of parameters required for the communication protocols increases, more control channel bandwidth is required. To save control channel bandwidth, some data communication standards have specified that some parameters should be communicated over a traffic channel. Each time an access terminal enters a new cell or sector of the access network or another access network, the parameters are negotiated because the portions of the access network serving different cells or sectors can operate according to different parameters. Unfortunately, this can significantly increase the time it takes to set up communication between an access terminal and the access network because instead of broadcasting the parameters on the control channel, the access network has to send parameters to individual access terminals. Specifically, in response to an access request from an access terminal, the access network must communicate each parameter to the access terminal over the traffic channel and wait for a response to each communication from the access terminal. The communication of messages from the access network and confirmation responses from the access terminal is called negotiation of the parameters.

As explained above, each parameter is negotiated. This can significantly increase the set up time, and may result in set up failures. Accordingly, a demand exists for a methodology to reduce the negotiation process and therefore the set up time.

SUMMARY OF THE INVENTION

The present invention provides a method for configuration negotiation in a data communication system that reduces the number of parameters that need to be negotiated. This advantageously reduces set up times and reduces the occurrence of set up failures.

In an embodiment of the present invention, the access terminal sends a token along with a request to access the network. The token has a bit associated with each parameter group type including parameters that are conventionally negotiated. The state of the bit indicates whether the access terminal operates according to a default parameter group of the associated parameter group type. The access network examines the token, and will send information to and receive information from the access terminal (i.e., communicate) according to the default parameter group without negotiating a parameter group when the portion of the access network communicating with the access terminal operates according to the default parameter group for that parameter group type and the bit in the token associated with the parameter group type indicates that the access terminal operates according to the default parameter group. Furthermore, when the a bit indicates the access terminal does not operate according to a default parameter group, the access network accesses its core memory to obtain a stored parameter group of the parameter group type for the access terminal. If the portion of the access network communicating with the access terminal operates according to the stored parameter group, then the access network sends information to and receives information from the access terminal according to the stored parameter group without negotiating a parameter group of the parameter group type. If the access network does not store a parameter group of the parameter group type for the access terminal, the access terminal negotiates a parameter group of the parameter group type, or in an alternative embodiment, accesses the stored parameter group of the parameter group type from another access network.

By use of the token, the access network reduces the number of parameters that must be negotiated with the access terminal. This reduces the set up time, and therefore, set up failures.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
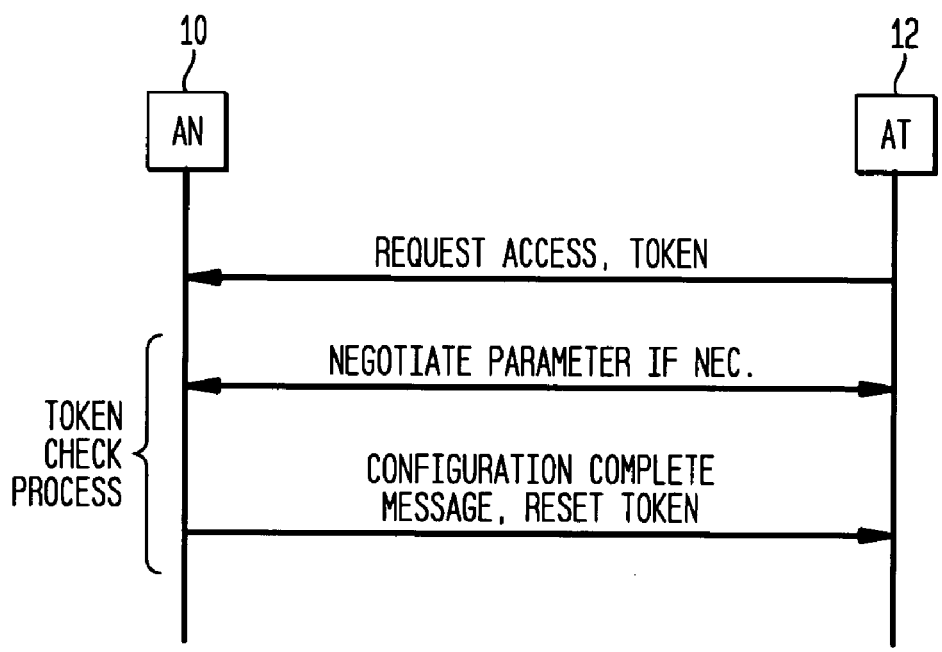
FIG. 1 illustrates the communication between the access terminal and the access network during set up.

FIG. 1 illustrates the communication between an access terminal 12 and an access network 10 during set up. As shown, the access terminal 12 sends an access request and a token to the access network 10. The access request is the conventional version of such a request. The token includes a bit for each parameter group type (e.g., access protocol, power control protocol, etc.) including parameters that are being negotiated over the traffic channel as discussed in the background of the invention section. However, it will be understood that the present invention is not limited to these parameter group types, and the token could include bits associated with more or less than these parameter group types. The state of a bit, "0" or "1", in the token indicates whether the access terminal 12 operates according to a predetermined default parameter group for the associated parameter group type or a non-default parameter group for the associated parameter group type. It is up to the system designer as to whether a bit value of "0" or "1" represents a default parameter group or a non-default parameter group. In a preferred embodiment of the present invention, a bit value of "0" represents a default parameter group.

Upon receipt of the access request and token, the access network 10 processes the token and negotiates parameters with the access terminal 12. Specifically, the access network 10 performs the negotiation methodology according to an embodiment of the present invention illustrated in FIG. 2. As shown, in step S10 the access network 10 receives the access request and the token. Then in step S20, the access network 10 determines if the token is a null token. In a null token, all of the bits are zero. The null token is sent by the access terminal 12 when the access request is a first access request. Because this is the first access request from this access terminal, the access network 10 will, in step S30, negotiate all of the necessary parameters.

However, if in step S20, the access network 10 determines the token is not a null token, then in step S40, the access network 10 accesses its core memory to obtain a stored parameter group of each parameter group type for the access terminal 12. The stored parameter groups of the parameter group types for the access terminal 12 are the parameter groups of the parameter group types previously established between the access network 10 and the access terminal 12 before receipt of the current access request. If the core memory in the access network 10 does not include parameter group data on the access terminal 12, processing proceeds to step S50. In step S50, the access network 10 compares the token to the parameter groups of the parameter group types for the portion of the access network 10 serving the communication needs of the access terminal 12, and negotiates the parameters based on the comparison. Specifically, the access network 10 examines the token, and will send information to and receive information from the access terminal (i.e., communicate with the access terminal) according to the predetermined default parameter group of a parameter group type without negotiating a parameter group of the parameter group type when the portion of the access network 10 communicating with the access terminal 12 operates according to the default parameter group for that parameter group type and the bit in the token associated with the parameter group type indicates that the access terminal 12 operates according to the default parameter group. However, the access network 10 negotiates the parameter group of a parameter when either the portion of the access network 10 communicating with the access terminal 12 operates according to a parameter group other than the default parameter group of the parameter group type or the bit in the token associated with the parameter group type indicates the access terminal 12 operates according to a non-default parameter group.

Returning to step S40, if the access network 10 does access the parameter groups of the parameter group types for the access terminal 12 from its core memory, processing proceeds to step S60. In step S60, the access network 10 compares the token to the parameter groups of the parameter group types for the portion of the access network 10 serving the communication needs of the access terminal 12 and negotiates the parameters based on the comparison as discussed above with respect to step S50 except for when the bit in the token indicates the access terminal 12 operates according to a non-default parameter group for a parameter group type. In this situation, the access network 10 determines if the portion of the access network 10 communicating with access terminal 12 also operates according to a non-default parameter group. If not, then the access network 10 negotiates the parameter group of the parameter group type with the access terminal 12.

If the portion of the access network 10 sending information to and receiving information from the access terminal 12 also operates according to a non-default parameter group, the access network 10 determines if the stored parameter group of the parameter group type for the access terminal 12 is the same as the non-default parameter group by which the portion of the access network 10 communicating with access terminal

12 operates. If so, then the access network 10 communicates with the access terminal 12 according to the stored parameter group without having to negotiate a parameter group of the parameter group type. Otherwise, the access network 10 negotiates a parameter group of the parameter group type with the access terminal 12.

After steps S30, S60 and S50, processing proceeds to step S70. In step S70, configuration negotiation has been completed and as shown in FIG. 1, and the access network 10 sends the access terminal 12 a configuration complete message and a reset token. The reset token is a token reflecting the current parameter group of the parameters upon which communication between the access terminal 12 and the access network 10 is based. The access terminal 12 will send the reset token with its next access request.

Figure 2:
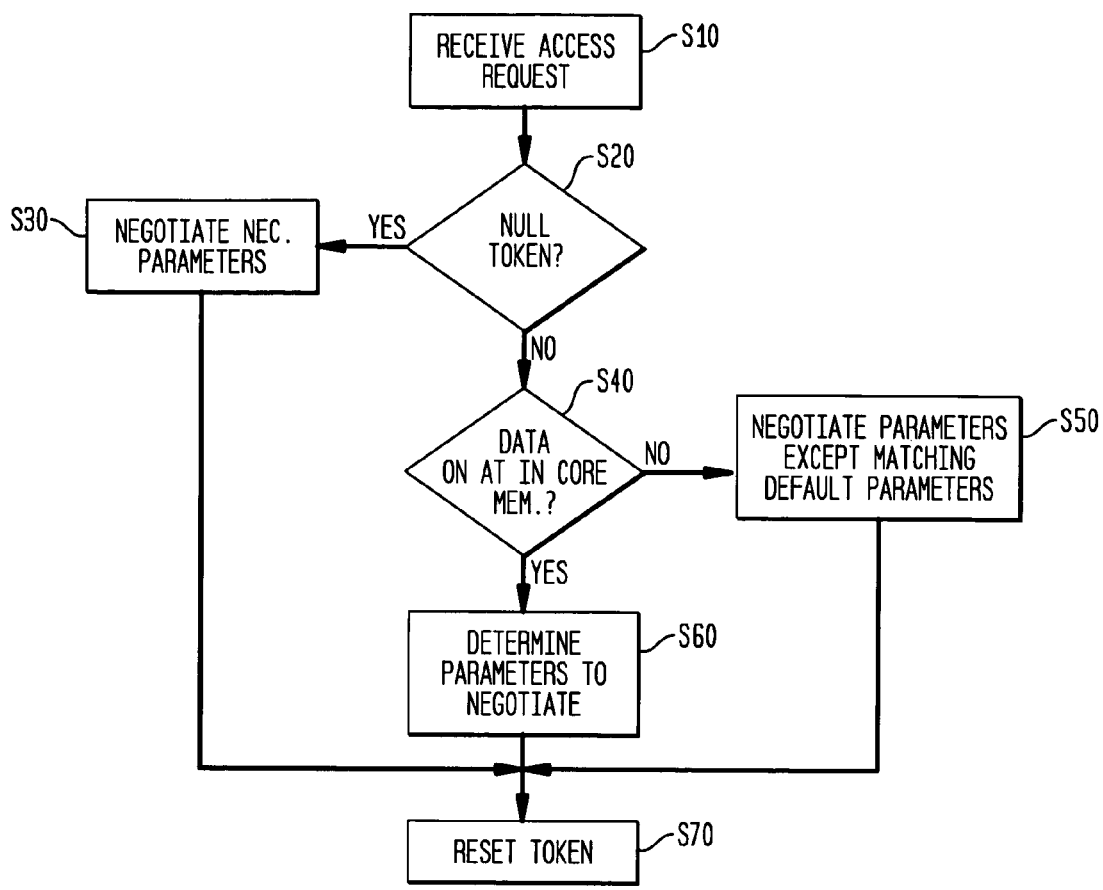
FIG. 2 illustrates a flow chart of the negotiation methodology according to an embodiment of the present invention.
Figure 3:
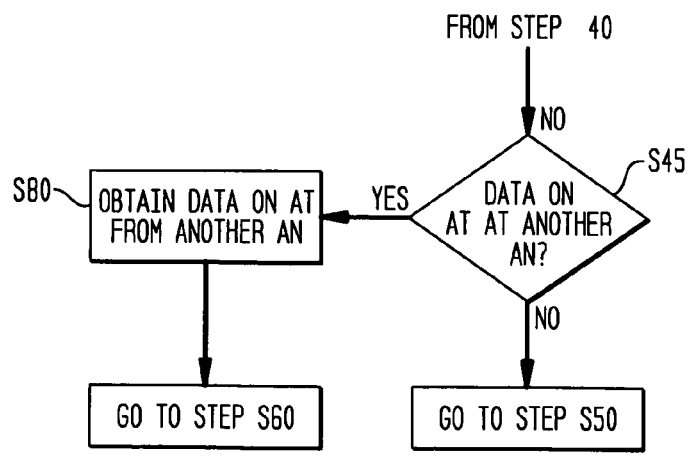
FIG. 3 illustrates a modification of the flow chart of FIG. 2 and represents another embodiment of the negotiation methodology according to the present invention.

FIG. 3 illustrates a modification of the flow chart of FIG. 2 and represents another embodiment of the negotiation methodology according to the present invention. As shown in FIG. 3, if in step S40 the access network 10 fails to access parameter data on the access terminal 12 from its core memory, the access network 10 determines in step S45 whether the parameter data is available from another access network. If not, then processing proceeds to step S50. However, if the parameter data is available from another access network, then in step S80, the access network 12 obtains the parameter data from the other access network and processing proceeds to step S60.

As demonstrated above, the negotiation methodology according to the present invention reduces the number of parameters that must be negotiated between an access terminal and an access network. Consequently, this advantageously reduces set up times and reduces the occurrence of set up failures.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for configuration negotiation in a data communication system, comprising:
   receiving, at an access network, an access request and a token from an access terminal, the token including a plurality of bits, each bit of the plurality of bits associated with a different type of protocol, such that each bit indicates whether the access terminal is operating according to a default protocol for the associated type of protocol;
   sending information to and receiving information from the access terminal according to the default protocol without negotiating parameters for the associated type of protocol and without sending the parameters for the associated type of protocol to the access terminal when a portion of the access network communicating with the access terminal operates according to the default protocol for the associated type of protocol and a bit of the plurality of bits indicates the access terminal operates according to the default protocol for the associated type of protocol.

2. The method of claim 1, further comprising:
   sending information to and receiving information from the access terminal after negotiating a protocol for the associated type of protocol when at least one of,
   (i) the portion of the access network communicating with the access terminal operates according to a protocol other than the default protocol for the associated type of protocol and the bit indicates the access terminal operates according to the default protocol for the associated type of protocol, and (ii) the portion of the access network communicating with the access terminal operates according to the default protocol for the associated type of protocol and the bit indicates the access terminal operates according to a protocol other than the default protocol for the parameter group type of protocol.

3. The method of claim 1, further comprising:

first accessing memory at the access network when the bit indicates the access terminal is not operating according to the default protocol to obtain a stored protocol of the associated type of protocol for the access terminal; and sending information to and receiving information from the access terminal according to the stored protocol of the associated type of protocol for the access terminal without negotiating a protocol of the associated type of protocol when a portion of the access network communicating with the access terminal operates according to the stored protocol for the associated type of protocol.

4. The method of claim 3, further comprising:

sending information to and receiving information from the access terminal after negotiating a protocol of the associated type of protocol when the portion of the access network communicating with the access terminal operates according to a protocol of the associated type of protocol which is different from the stored protocol of the associated type of protocol for the access terminal.

5. The method of claim 3, further comprising:

sending information to and receiving information from the access terminal after negotiating a protocol of the associated type of protocol when the first accessing step fails to access a stored protocol of the associated type of protocol for the access terminal.

6. The method of claim 3, further comprising:

second accessing memory at another access network to obtain a stored protocol of the associated type of protocol for the access terminal when the first accessing step fails to access a stored protocol of the associated type of protocol for the access terminal and the bit indicates the access terminal is not operating according to the default protocol.

7. The method of claim 6, further comprising:

sending information to and receiving information from the access terminal after negotiating a protocol of the associated type of protocol when the first and second accessing steps fail to access a stored protocol of the associated type of protocol for the access terminal.

8. The method of claim 5, further comprising:

sending the access terminal a new token indicating a current protocol of each type of protocol after negotiations are complete.

9. The method of claim 2, further comprising:

sending the access terminal a new token indicating a current protocol of each type of protocol after negotiations are complete.

10. A method comprising:

receiving, at an access network, an access request and a token from an access terminal, the token including a plurality of bits, each bit of the plurality of bits associated with a different type of protocol, such that each bit indicates whether the access terminal is operating according to default protocol for the associated type of protocol, the access terminal having a first parameter set for the associated type of protocol;

first accessing memory at the access network when a bit of the plurality of bits indicates the access terminal is not operating according to the default protocol in an attempt to obtain a stored protocol of the associated type of protocol for the access terminal, the stored protocol indicating the first parameter set for the associated type of protocol; and sending information to the access terminal according to the stored protocol of the associated type of protocol for the access terminal when a portion of the access network communicating with the access terminal operates according to the stored protocol for the associated type of protocol.

11. The method of claim 10, further comprising:

negotiating a protocol of the associated type of protocol when the portion of the access network communicating with the access terminal operates according to a protocol of the type of protocol which is different from the stored protocol of the associated type of protocol for the access terminal; and sending information to and receiving information from the access terminal according to the protocol negotiated.

12. The method of claim 10, further comprising:

sending information to and receiving information from the access terminal after negotiating a protocol of the associated type of protocol when the first accessing step fails to obtain a stored protocol of the associated type of protocols for the access terminal.

13. The method of claim 10, further comprising:

second accessing memory at another access network in an attempt to obtain a stored protocol of the associated type of protocol for the access terminal when the first accessing step fails to obtain a stored protocol of the associated type of protocol for the access terminal and the bit indicates the access terminal is not operating according to the default protocol.

14. The method of claim 13, further comprising:

sending information to and receiving information from the access terminal after negotiating a protocol of the associated type of protocol when the first and second accessing steps fail to obtain a protocol of the associated type of protocol for the access terminal.

15. The method of claim 11, further comprising:

sending the access terminal a new token indicating a current protocol of each of the type of protocol after negotiations are complete.

16. A method for configuration negotiation in a data communication system, comprising:

storing protocols of at least one type of protocol previously established between an access network and an access terminal;

receiving, at the access network, an access request and a token from the access terminal, the token including a plurality of bits, each bit of the plurality of bits associated with a different type of protocol, such that each bit indicates whether the access terminal is operating according to a default protocol for the associated type of protocol;

sending information to and receiving information from the access terminal according to the default protocol without negotiating parameters for the associated type of protocol and without sending the parameters for the associated type of protocol to the access terminal when a portion of the access network communicating with the access terminal operates according to the default protocol for the associated one of the parameter group types and a bit of the plurality of bits indicates the access terminal operates according to the default protocol for the associated type of protocol.

17. The method of claim 7, further comprising:

sending the access terminal a new token indicating a current protocol of each of the type of protocol after negotiations are complete.

18. The method of claim 12, further comprising:

sending the access terminal a new token indicating a current protocol of each of the type of protocol after negotiations are complete.

19. The method of claim 14, further comprising:

sending the access terminal a new token indicating a current protocol of each of the type of protocol after negotiations are complete.

* * * * *

UNITED STATES PATENT AND TRADEMARK OFFICE
CERTIFICATE OF CORRECTION

| | | |
|---|---|---|
| PATENT NO. | : 7,647,389 B2 | Page 1 of 1 |
| APPLICATION NO. | : 10/084174 | |
| DATED | : January 12, 2010 | |
| INVENTOR(S) | : Jiang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Twenty-eighth Day of December, 2010

David J. Kappos
*Director of the United States Patent and Trademark Office*